(12) United States Patent
Murata

(10) Patent No.: US 9,001,375 B2
(45) Date of Patent: Apr. 7, 2015

(54) MEDIUM STORING INSTRUCTIONS FOR INFORMATION PROCESSING APPARATUS AND PRINT CONTROL APPARATUS

(71) Applicant: Brother Kogyo Kabushiki Kaisha, Nagoya-shi, Aichi-ken (JP)

(72) Inventor: Mareyuki Murata, Kuwana (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/954,060

(22) Filed: Jul. 30, 2013

(65) Prior Publication Data

US 2014/0029058 A1    Jan. 30, 2014

(30) Foreign Application Priority Data

Jul. 30, 2012   (JP) ................. 2012-168220

(51) Int. Cl.
```
G06F 3/12      (2006.01)
G06K 15/00     (2006.01)
G06K 15/02     (2006.01)
H04N 1/60      (2006.01)
H04N 1/393     (2006.01)
```

(52) U.S. Cl.
CPC ............ *G06K 15/1868* (2013.01); *H04N 1/393* (2013.01)

(58) Field of Classification Search
None
See application file for complete search history.

(56) References Cited

U.S. PATENT DOCUMENTS

| | | | |
|---|---|---|---|
| 6,501,531 B1* | 12/2002 | Clark et al. ............... | 355/40 |
| 2005/0240865 A1* | 10/2005 | Atkins et al. .............. | 715/517 |
| 2007/0201053 A1* | 8/2007 | Sellers et al. .............. | 358/1.2 |
| 2008/0231896 A1* | 9/2008 | Sakurai et al. ............. | 358/1.15 |
| 2009/0322792 A1* | 12/2009 | Isoda ........................ | 345/661 |
| 2010/0149566 A1* | 6/2010 | Chimura .................... | 358/1.9 |
| 2010/0315659 A1* | 12/2010 | Tatsuno ..................... | 358/1.5 |
| 2012/0026515 A1 | 2/2012 | Muramoto | |

FOREIGN PATENT DOCUMENTS

JP          2012-34008 A     2/2012

* cited by examiner

*Primary Examiner* — Marivelisse Santiago Cordero
*Assistant Examiner* — Moustapha Diaby
(74) *Attorney, Agent, or Firm* — Merchant & Gould PC

(57) ABSTRACT

A non-transitory computer-readable medium stores computer-executable instructions. When the instructions are executed by a processor, the instructions cause an information processing apparatus, to perform: a first receiving process for receiving a setting of a first allocation number; a size determining process for determining a size of an allocation area which is to be allocated to one image on the sheet; a judging process for judging whether it is possible to arrange the allocation areas of the size determined in the size determining process, according to a second allocation number which is greater than the first allocation number; and a guiding process for guiding that it is possible to allocate the image according to the second allocation number while maintaining the size of the allocation area determined in the size determining process for each of the images.

16 Claims, 10 Drawing Sheets

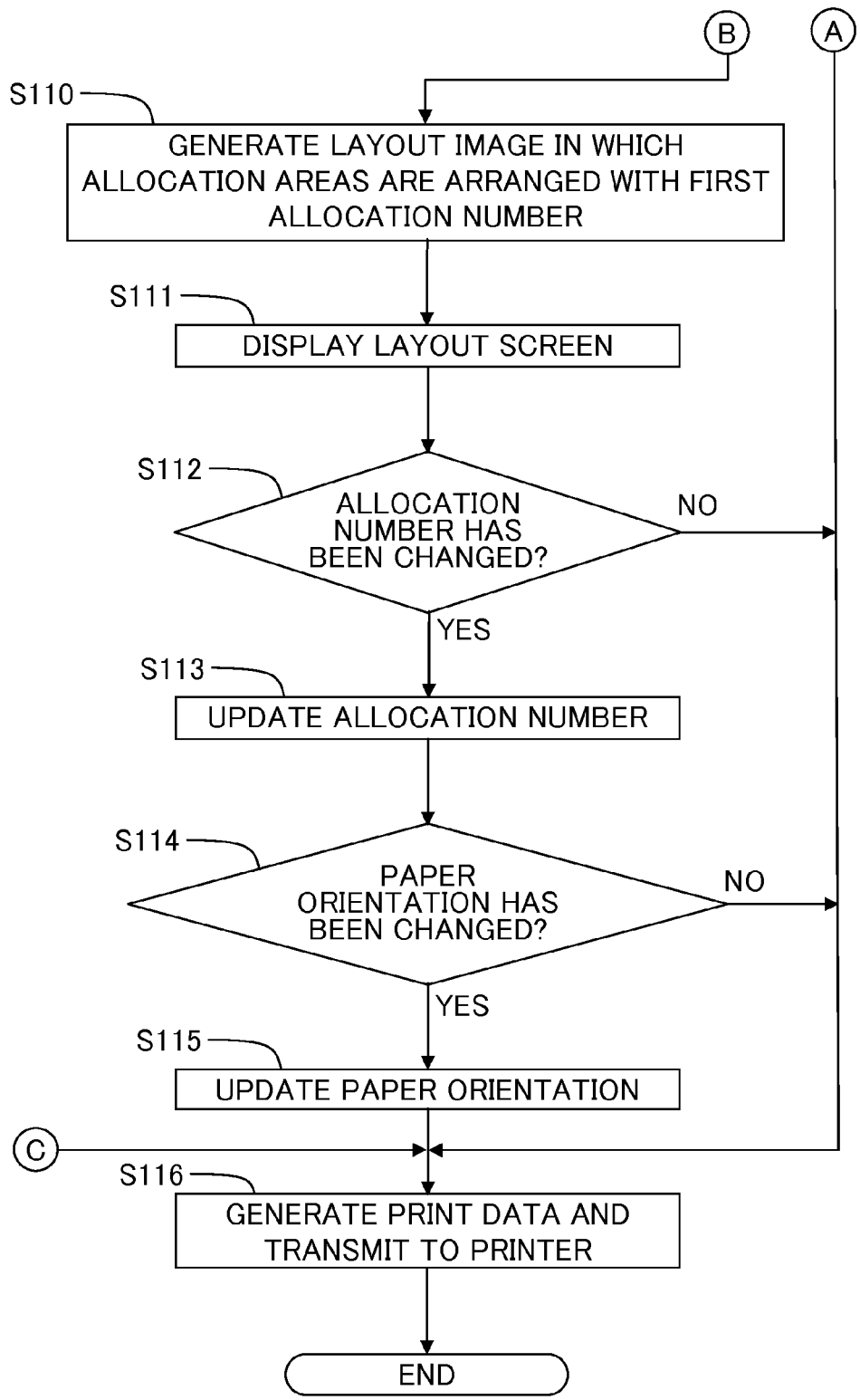

MEDIUM STORING INSTRUCTIONS FOR INFORMATION PROCESSING APPARATUS AND PRINT CONTROL APPARATUS

CROSS REFERENCE TO RELATED APPLICATION

The present application claims priority from Japanese Patent Application No. 2012-168220 filed on Jul. 30, 2012, the disclosure of which is incorporated herein by reference in its entirety.

BACKGROUND OF THE INVENTION

1. Field of the Invention

The present invention relates to a technology for printing by allocating a plurality of images on one surface of a sheet.

2. Description of the Related Art

A so-called "N in 1" printing in which a plurality of images is printed upon allocating on one surface of a sheet has hitherto been known.

Generally, in the N in 1 printing, a setting of an allocation number which is the number of images to be allocated on one surface of a sheet is received by a user, and the number of images corresponding to the allocation number which has been received, are allocated on one surface of the sheet. However, when the number of images according to the allocation number which has been set by the user are allocated, sometimes a wasteful blank space is formed on a sheet.

SUMMARY OF THE INVENTION

An object of the present invention is to provide a technology which uses effectively a sheet without making a size of an image smaller as compared to a size of the image in a case that the images are allocated according to an allocation number which has been set by a user in an N in 1 printing.

According to an object of the present invention, there is provided a non-transitory computer-readable medium storing computer-executable instructions that, when executed by a processor, cause an information processing apparatus to: perform a first receiving process for receiving a setting of a first allocation number, which is the number of images to be allocated on one surface of a sheet; perform a size determining process for determining a size of an allocation area which is to be allocated to one image on the sheet, based on the first allocation number which has been received in the first receiving process; perform a judging process for judging whether it is possible to arrange, on the one surface of the sheet, allocation areas each of which has the size determined in the size determining process, according to a second allocation number which is greater than the first allocation number; and perform a guiding process for guiding that it is possible to allocate the images according to the second allocation number while maintaining the size of the allocation area determined in the size determining process for each of the images, in a case that it is judged in the judging process that it is possible to arrange the allocation areas according to the second allocation number.

As the instructions are executed by the processor of the information processing apparatus, the user who has been informed that it is possible to allocate the images according to the second allocation number which is greater than the first allocation number, by resetting the allocation number from the first allocation number to the second allocation number, is able to allocate on one sheet the number of images greater than the first allocation number, with the size of the images is maintained to be same as in a case that the images had been allocated with the first allocation number which was set in the beginning. Therefore, according to the computer-readable storage medium in which the instructions are stored, in the N in 1 printing, it is possible to use a sheet effectively without making the size of images smaller as compared to a case in which the images are allocated according to an allocation number which has been set by the user.

A technology disclosed in the present patent specification enables to realize by various modes such as an information processing apparatus, an information processing system, a print control apparatus, a print control method, and a recording medium in which a print-control computer program has been recorded.

BRIEF DESCRIPTION OF THE DRAWINGS

FIGS. 8A and 8B show a flowchart of a print control process.

DESCRIPTION OF THE PREFERRED EMBODIMENTS

First Embodiment

A first embodiment of the present invention will be described below while referring to diagrams from FIG. 1 to FIG. 9.

<Electrical Configuration of PC>

Figure 1:
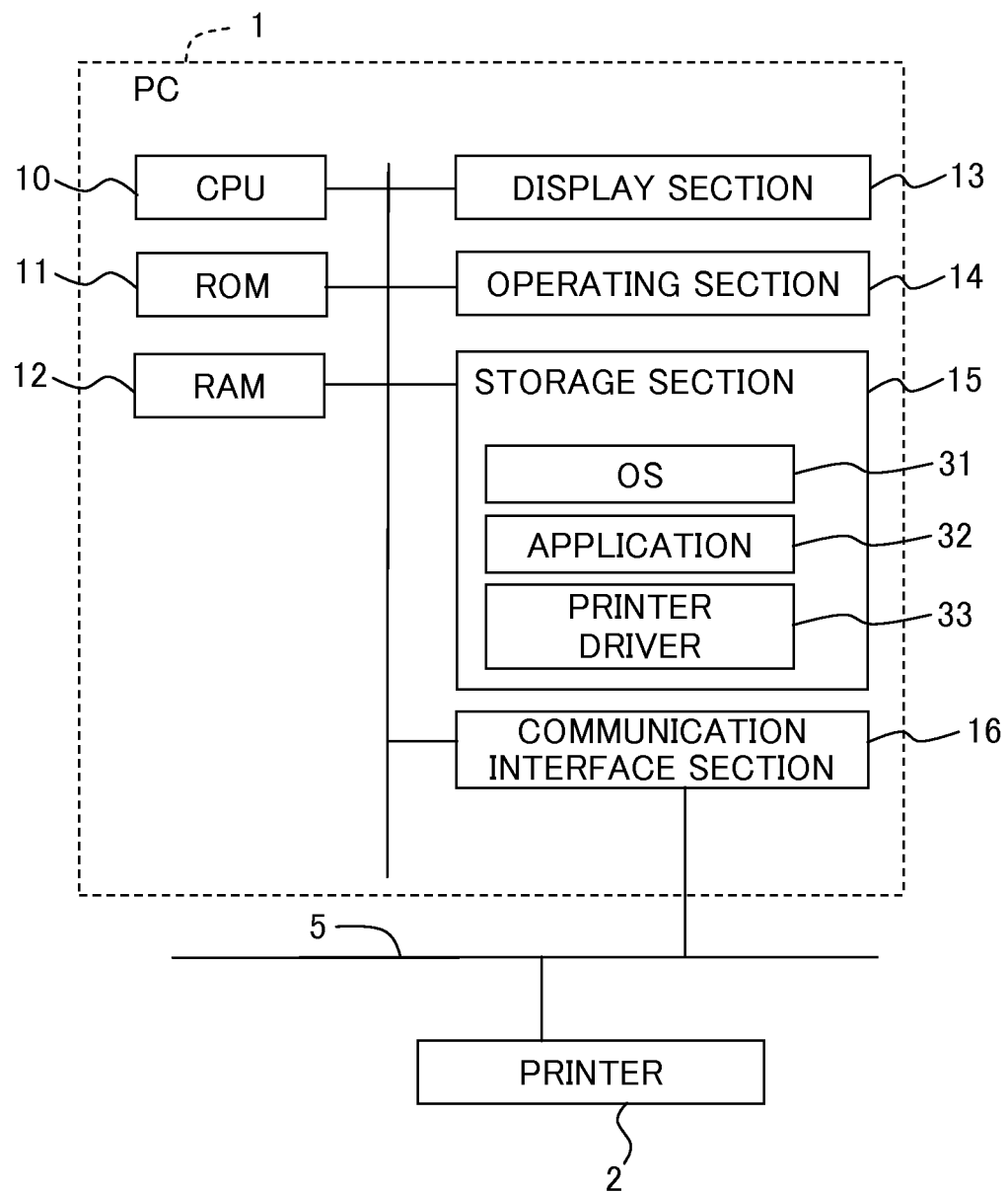
FIG. 1 is a block diagram showing in a simplified form, an electrical configuration of a PC (personal computer) according to a first embodiment.

To start with, an electrical configuration of a personal computer (hereinafter, referred to as a "PC") 1 as an information processing apparatus and a print control apparatus according to the first embodiment will be described below by referring to FIG. 1. The PC 1 includes a CPU (central processing unit) 10, a ROM (read only memory) 11, a RAM (random access memory) 12, a display section 13, an operating section 14, a storage section 15, and a communication interface section 16.

The CPU 10 controls each section of the PC 1 by executing computer programs which have been stored in the ROM 11 and the storage section 15. Data and computer programs to be executed by the CPU 10 are stored in the ROM 11. The RAM 12 is utilized as a main storage device for executing various processes by the CPU 10. The CPU 10 is an example of a processing section.

The display section 13 includes a display unit such as a liquid-crystal display, and a display drive circuit which drives the display unit. The display section 13 is an example of a guiding section. The operating section 14 includes a keyboard, a mouse, and an interface to which the keyboard and the mouse are to be connected.

The storage section 15 is a unit which stores various data and computer programs by using a non-volatile memory such as a hard disc and a flash memory. The storage section 15 has an operating system (hereinafter, referred to as "OS") 31, application programs (hereinafter, referred to as "applications") 32, and printer driver programs (hereinafter, referred to as "printer driver") 33 which control a printer 2. The printer driver 33 is an example of a print control program.

The communication interface section 16 is an interface for communicating with an external apparatus such as the printer 2, via a communication network 5 such as the Internet and the LAN (Local Area Network). The communication interface section 16 may have an arrangement of being connected to the printer 2 via a USB (Universal Serial Bus) or a parallel line. Moreover, the communication interface section 16 may be a communication interface section which communicates with an external apparatus by wired communication or may be a communication interface section which communicates with an external apparatus by wireless communication. The printer 2 is an apparatus which prints an image on a sheet such as a printing paper (hereinafter, referred to as a "paper") by an electrophotography or by an ink jet method.

<N in 1 Printing>

Next, an N in 1 printing will be described below by referring to FIG. 2. The printer driver 33 is arranged to be capable of executing the N in 1 printing. The N in 1 printing means printing upon allocating one or more than one images on one paper. "N" in "N in 1" indicates an allocation number which is the number of images to be allocated on one sheet.

Figure 2:
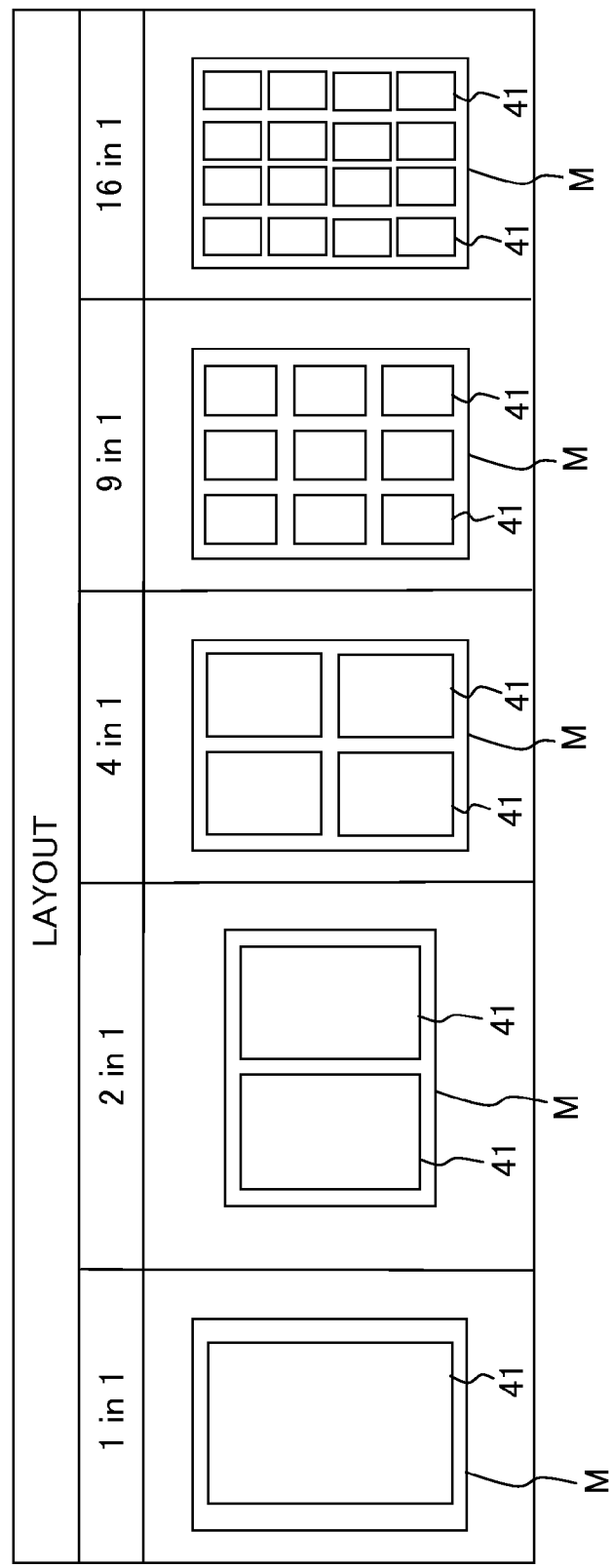
FIG. 2 is a schematic diagram for explaining an N in 1 printing.

FIG. 2 shows cases in which the printing has been carried out according to 1 in 1, 2 in 1, 4 in 1, 9 in 1, and 16 in 1. The allocation numbers which can be set are not restricted to the abovementioned numbers, and the user is able to setting arbitrarily other allocation numbers such as 6 in 1 and 8 in 1.

A rectangular area 41 on each paper M indicates an allocation area on which a respective image is to be allocated. In FIG. 2, reference numerals of some of the allocation areas are omitted. In the N in 1 printing, N number of allocation areas 41 are arranged on one surface of a paper, and sizes of all the N number of allocation areas 41 are same. An image is allocated upon being reduced to be accommodated in the allocation area 41. An aspect ratio of the allocation area 41 is same as an aspect ratio of a printable area of the paper M. Here, the printable area corresponds to an area after excluding an area of a blank space (margin) on which the image is not to be printed, from the paper M. The aspect ratio of the allocation area 41 may be same as an aspect ratio of the paper M, or an arrangement may be made such that the aspect ratio of the allocation area 41 is to be specified by a user.

In FIG. 2, a case in which the allocation area 41 is arranged in a portrait orientation has been shown. However, a setting of as to whether the allocation area 41 is to be arranged in a portrait orientation or in a landscape orientation can be carried out by the user as an orientation of image, on a print setting screen 60 (refer to FIG. 3) which will be described later. Therefore, even when the direction of the paper M is in the portrait orientation, sometimes the allocation area 41 is arranged in the landscape orientation.

For a combination of the image direction (direction of allocation area) and the allocation number, the orientation of the paper has been associated with in advance. In an example shown in FIG. 2, the landscape orientation (width>height) has been associated with a combination of an image in the portrait orientation (height>width) and 2 in 1 print, as an orientation of paper. Moreover, the portrait orientation has been associated with a combination of an image in the portrait orientation and the allocation number other than 2, as the orientation of paper. Although is not shown in FIG. 2, the portrait orientation has been associated with a combination of an image in the landscape orientation and 2 in 1 print, as the orientation of paper.

Similarly, for the other allocation numbers, an arrangement is to be made such that the orientation of paper has been associated with in advance for the combinations of the orientation of image and the allocation number. In the example shown in FIG. 2, in a case of arranging an image in the portrait orientation by 6 in 1 print or by 8 in 1 print, the landscape orientation is let to be associated with as the orientation of paper. An arrangement may be made such that, the orientation of paper can be set by the user irrespective of the orientation of image and the allocation number.

Moreover, in the combinations of the orientation of image and the allocation number, the number of rows (lines) and the number of columns (hereinafter, expressed by "number of rows×number of columns") at the time of allocating the image to the paper M are also associated with in advance. For instance, in a case of arranging images in the portrait orientation by 2 in 1, 1×2 is associated with as the number of rows and the number of columns, in a case of arranging an image in the portrait orientation by 4 in 1, 2×2 is associated with as the number of rows and the number of columns, and in a case of arranging an image in the portrait orientation by 9 in 1, 3×3 is associated with as the number of rows and the number of columns.

<Print Setting Screen>

Figure 3:
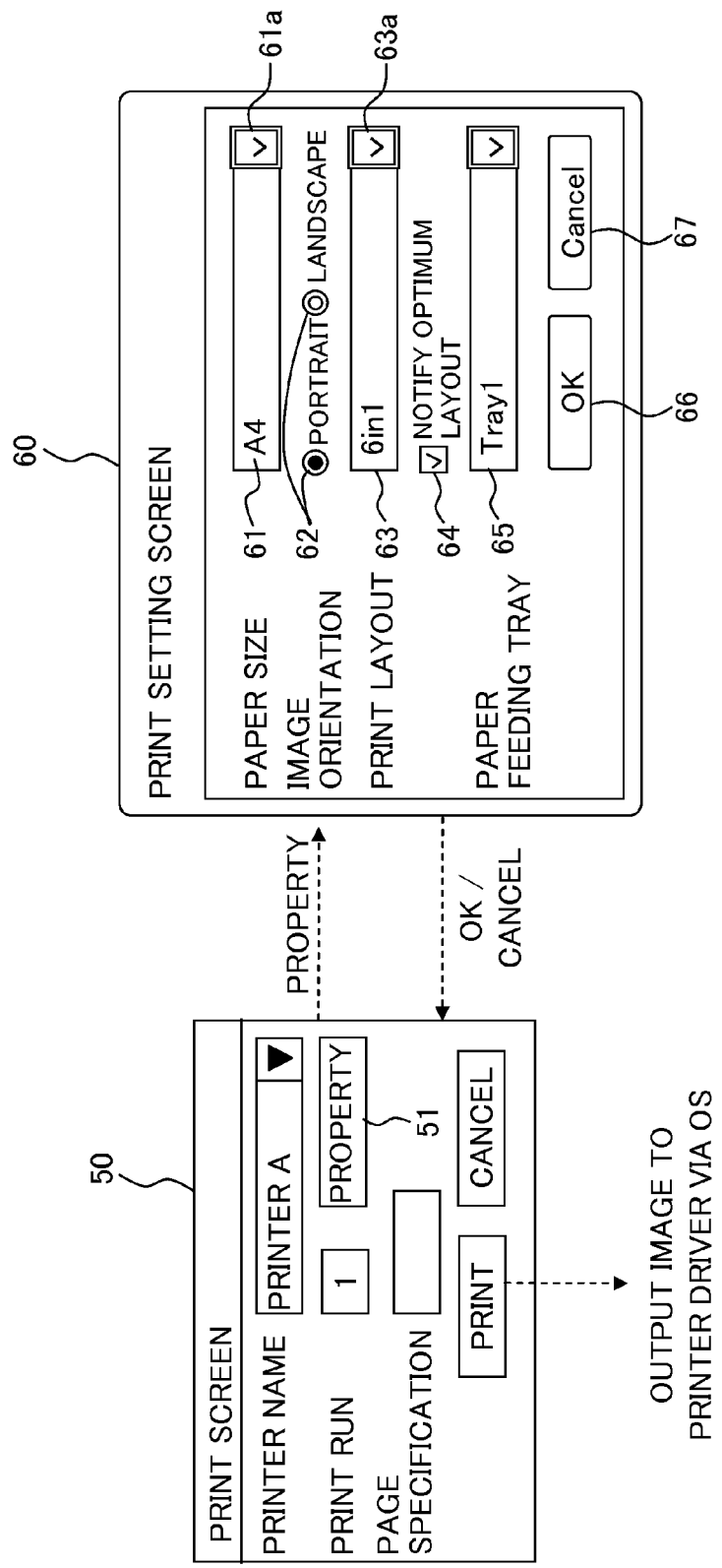
FIG. 3 is a schematic diagram showing a print setting screen.

Next, the print setting screen 60 which is displayed by the printer driver 33 will be described below by referring to FIG. 3. The user, by clicking a property button 51 upon selecting a printer on a print screen displayed by the application 32, is capable of giving an instruction to a printer driver which controls the printer which has been selected, to display the print setting screen 60. In FIG. 3, an example in which a "printer A" has been selected, and the instruction for displaying the print setting screen 60 has been given, is shown.

As the instruction is given for the display of the print setting screen 60, a printer driver which controls the "printer A", or in other words, the printer driver 33 displays the print setting screen 60 on the display section 13. In the print setting screen 60 of the example shown in FIG. 3, it is possible to set setting values of print setting items such as a paper size 61, an image orientation 62, a print layout 63, "notify optimum layout" 64, and a paper feeding tray 65.

The paper size 61 is an item for setting a size of a paper on which an image is to be printed. The user, by clicking a button 61a, is able to select a fixed size which has been registered in advance, such as A3 (297 mm×420 mm), A4 (210 mm×297 mm), and B5 (182 mm×257 mm) in a pull-down menu which is displayed, and is also able to input an arbitrary size. In a case of inputting the arbitrary size, the user inputs a horizontal size and a vertical size of the paper in the units of millimeters such as 300 mm×200 mm. The image orientation 62 is an item for setting an orientation of the allocation area mentioned above (refer to FIG. 2).

The print layout 63 is an item for setting the allocation number. The user is able to select the allocation numbers such as 1 in 1, 2 in 1, 4 in 1, 9 in 1, and 16 in 1 which have been registered in advance, on a pull-down menu which is displayed by clicking a button 63a, and is also able to input an arbitrary allocation number such as 6 in 1. In the description that follows, the allocation which has been set in the print layout 63 will be called as a first allocation. A process in which the printer driver 33 displays the print setting screen 60, and receives a setting of the first allocation is an example of a first receiving process and a receiving process.

The "notify optimum layout" 64 is an item for the user to set as to whether or not to inform the user about a case in which it is possible to allocate the number of images on one surface of a paper, larger than a first allocation number while maintaining a size of an image in a case in which an image is allocated on the one surface of the paper of a size set by the paper size 61 according to the first allocation number. A process in which the printer driver 33 displays the print setting screen 60, and receives a setting of the "notify optimum layout" 64 is an example of a second receiving process.

As the user clicks an OK button 66 on the print setting screen 60, the screen returns to a print screen 50 after the printer driver 33 has updated a print condition of default stored in the RAM 12 to a set value which had been set on the print setting screen 60. Whereas, when a cancel button 67 has been clicked, the screen returns to the print screen 50 after the printer driver 33 has discarded the set value which had been set. As the user gives an instruction for printing, on the print screen 50, an image to be printed is output to the printer driver 33 from the application 32 via the OS 31.

<Second Allocation Number>

Next, a second allocation number will be described below by referring to FIG. 4, FIG. 5, and FIG. 6. The second allocation number is an allocation number which is higher than the first allocation number which has been set on the print setting screen 60, and is an allocation number which enables to allocate the number of images larger than the first allocation number on one surface of the paper, with the size of an image maintained to be same as in a case in which the image has been allocated according to the first allocation number on the one surface of the paper of a size which has been set by the paper size 61.

Figure 4:
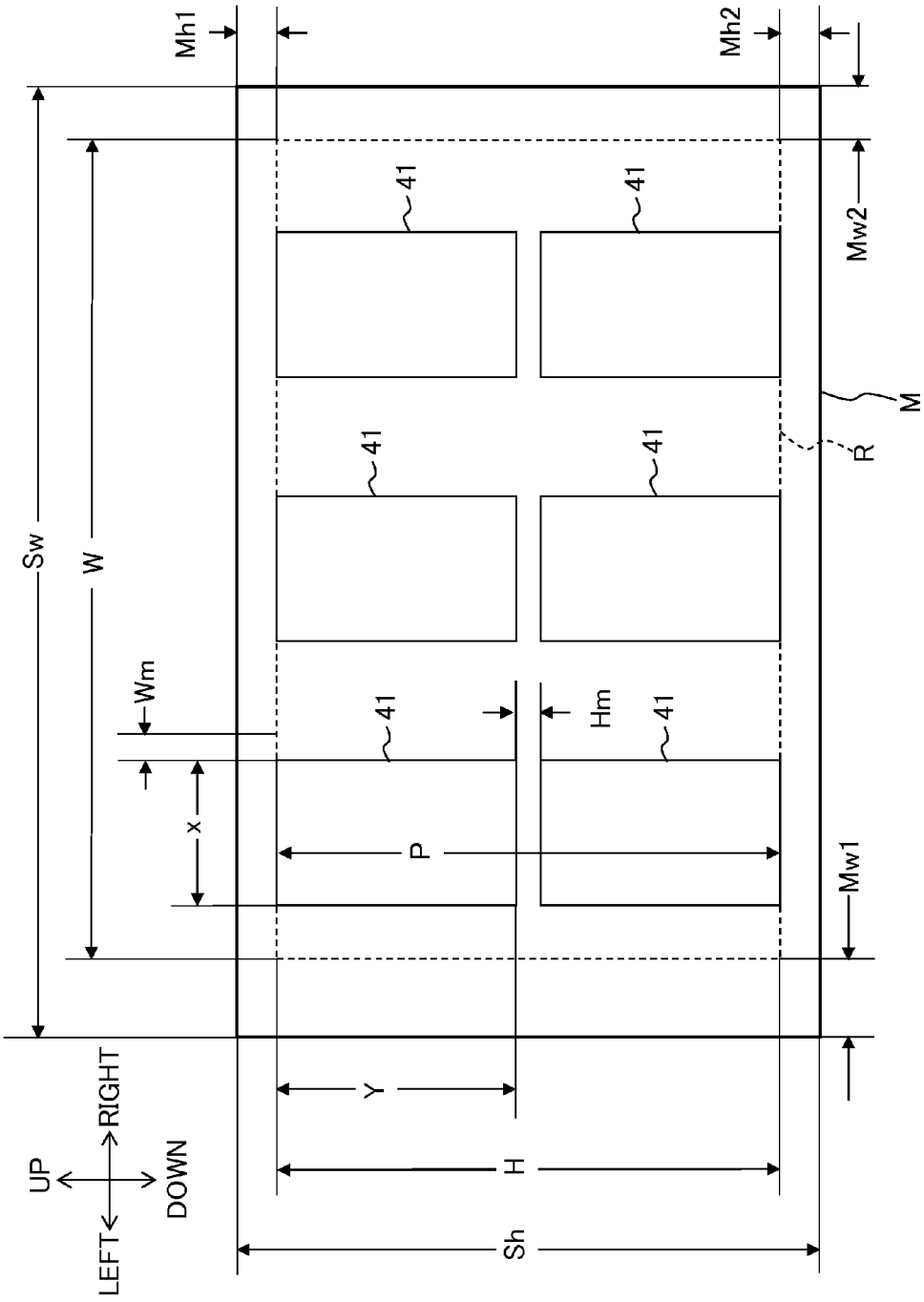
FIG. 4 is a schematic diagram showing a paper in which allocation areas are arranged according to 6 in 1.

For instance, FIG. 4 shows a case in which 6 in 1 has been set as the first allocation number on the print setting screen 1. By 6 in 1 being set in the example shown in FIG. 4, a large blank space is formed on the paper M. In a case in which a large blank space is formed on the paper in such manner, sometimes, by narrowing a distance between the adjacent allocation areas 41, it is possible to arrange the number of areas 41 larger than the first allocation number with the size of the allocation areas 41 maintained to be same as it has been.

Figure 5:
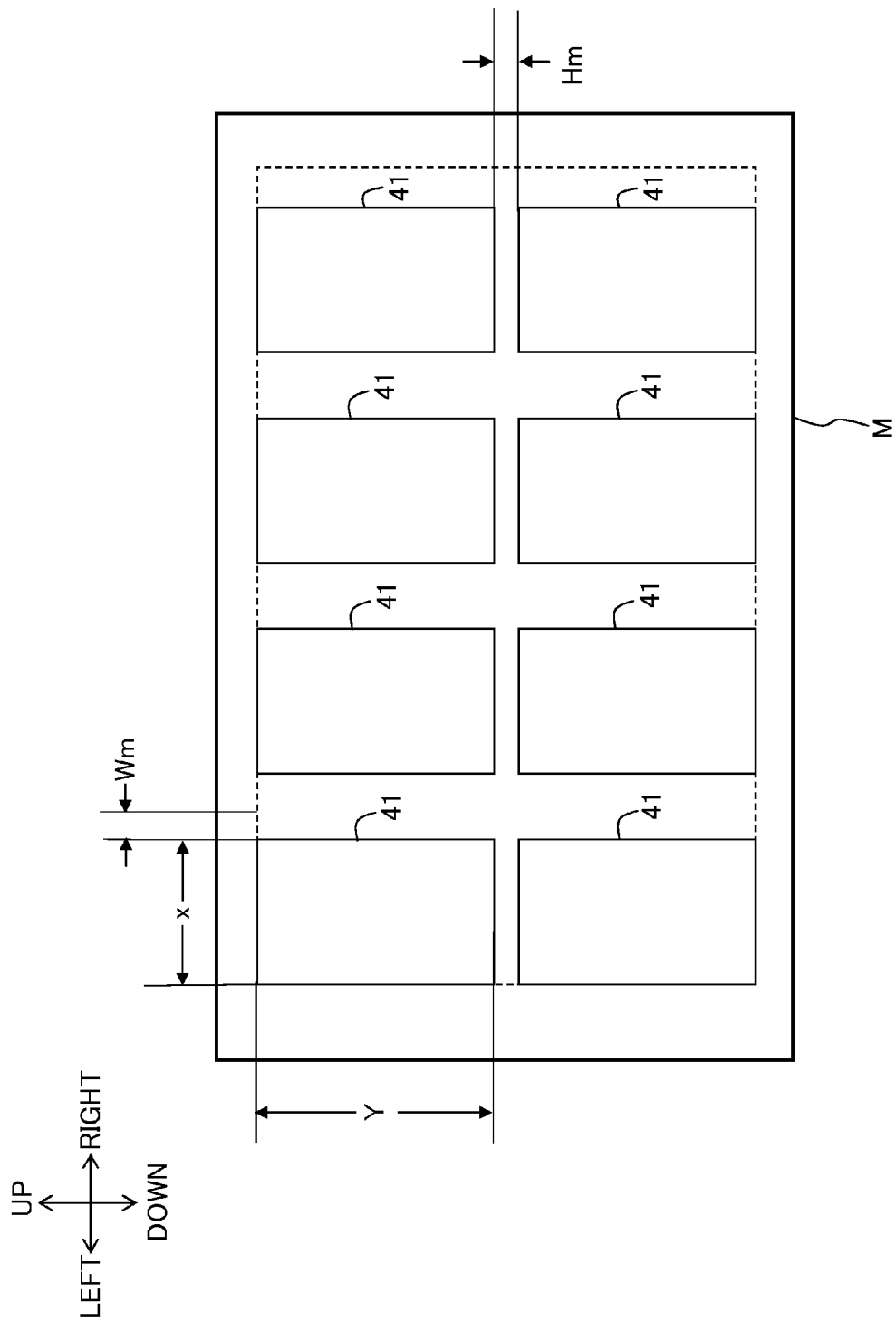
FIG. 5 is a schematic diagram showing a paper in which the allocation areas are arranged according to 8 in 1.

In a case of the example shown in FIG. 4 for instance, by narrowing the distance between the adjacent allocation areas 41, it is possible to arrange the allocation areas 41 according to 8 in 1 shown in FIG. 5. In this case, 8 in 1 corresponds to the second allocation number. Moreover, 7 in 1 is also possible, and here, the largest allocation number from among the plurality of allocation numbers is to be called as the second allocation number.

Incidentally, the orientation of both the paper M shown in FIG. 4 and the paper M shown in FIG. 5 is the landscape orientation. Whereas, by letting the orientation of the paper M shown in FIG. 6 to be the portrait orientation, sometimes, even larger second allocation number does exist. By letting the orientation of the paper M to be the portrait orientation in an example shown in FIG. 6, the allocation areas 41 are arranged according to 9 in 1 with the size of the allocation areas 41 maintained to be same as it has been. Moreover, arrangement according to 7 in 1 and an arrangement according to 8 in 1 are also possible. However, the largest allocation number being 9 in 1, the second allocation number with the orientation of the paper let to be the portrait orientation becomes 9 in 1.

Figure 6:
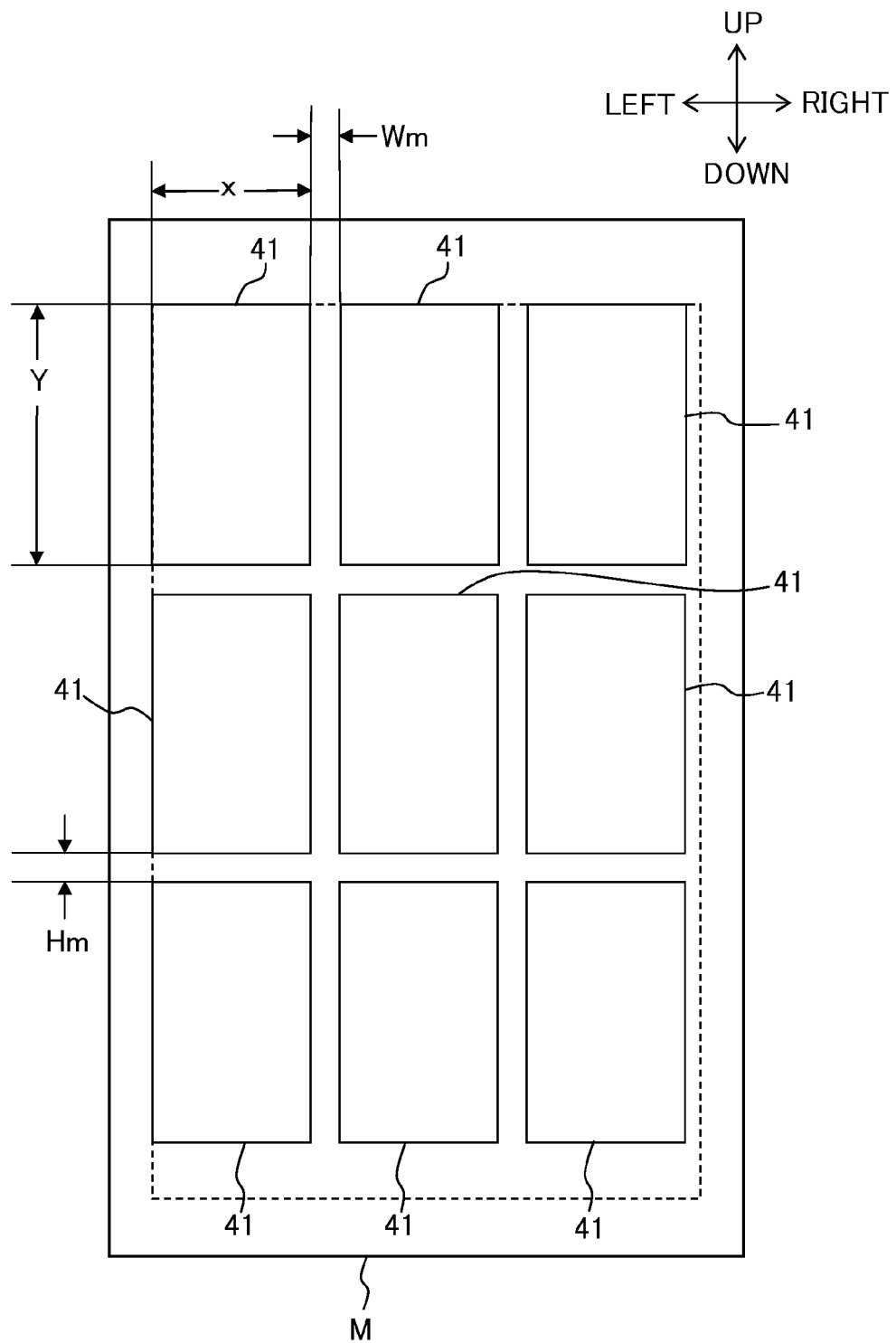
FIG. 6 is a schematic diagram showing a paper in which the allocation areas are arranged according to 9 in 1.

In other words, in the examples shown in the abovementioned FIG. 4, FIG. 5, and FIG. 6, since the second allocation number when the paper M is let to be in the landscape orientation is 8 in 1, and the second allocation when the paper M is let to be in the portrait orientation is 9 in 1, it means that the plurality of second allocation numbers exists.

<Print Control Process by Printer Driver>

As an image to be printed is outputted from the application 32 via the OS 31, the printer driver 33 executes a print control process which is a process for making the printer 2 print out the image which has been outputted. The print control process is executed based on print conditions which have been stored in the RAM 12.

Incidentally, as it has been mentioned above, sometimes, the second allocation number does exist with respect to the first allocation number. When an image is allocated according to the second allocation number, it is possible to allocate larger number of images without making a size of the images smaller as compared to case in which the images had been allocated according to the first allocation number. Therefore, in a case in which a set value of the "notify optimum layout" 64 of the print conditions is ON, the printer driver 33, in the print control process, makes a judgment of whether or not there exists the second allocation number. Moreover, in a case in which the second allocation number does exist, the printer driver 33 informs the user by displaying a layout screen 70 which will be described later, on the display section 13, that it is possible to allocate the images according to the second allocation number with the size of the images being maintained to be same as a size in a case in which the images had been allocated according to the first allocation number.

<Layout Screen>

Figure 7:
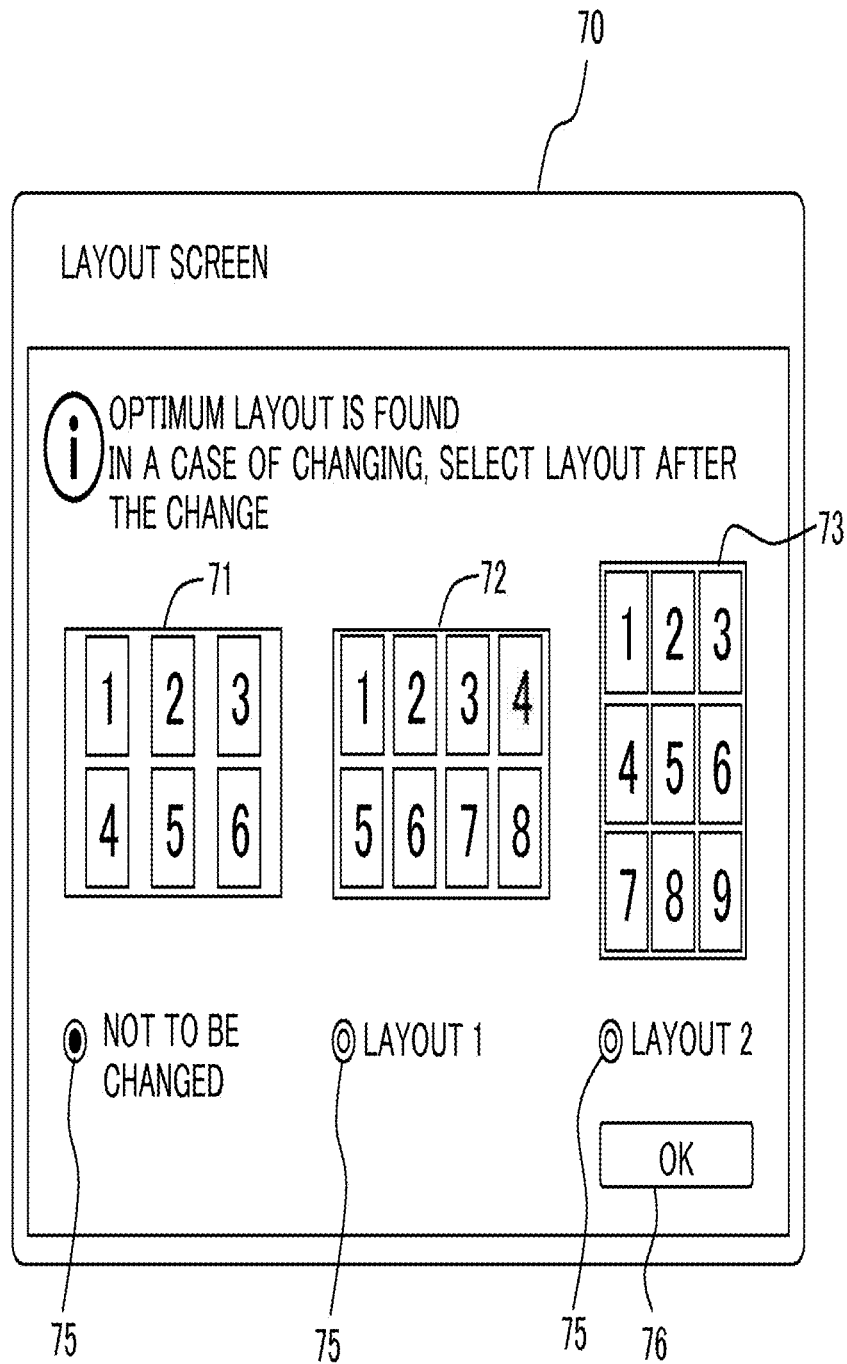
FIG. 7 is a schematic diagram showing a layout screen.

The layout screen 70 will be described below by referring to FIG. 7. For instance, in a case in which the first allocation number is 6 in 1, let the second allocation number when the paper is let to be in the landscape orientation be 8 in 1, and the second allocation number when the paper is let to be in the portrait orientation be 9 in 1. In this case, as shown in FIG. 7, a layout 71 in which the allocation areas are arranged according to 6 in 1 on a paper in the landscape orientation, a layout 72 in which the allocation areas are arranged according to 8 in 1 on a paper in the landscape orientation, and a layout 73 in which the allocation areas are arranged according to 9 in 1 on a paper in the portrait orientation are displayed on the layout screen 70. The size of the papers on which the layouts are displayed is the same. Moreover, the size of the allocation areas displayed in the layouts is also the same. Accordingly, it can be understood that it is possible to allocate the larger number of images on one surface of the paper of the size set by the user, with the size of the image maintained to be same as the size when the images had been allocated according to the first allocation number.

Moreover, radio buttons 75 which correspond to respective layouts are displayed on the layout screen 70. The user, by putting any of the radio buttons 75 ON, is able to select the layout corresponding to the radio button 75 which has been pressed. A process in which the printer driver displays the layout screen 70 on the display section 13 is an example of a guiding process and a selection process.

<Print Control Process by Printer Driver>

A print control process by the printer driver 33 will be described below concretely by referring to FIG. 8. At step S101, the CPU 10 which executes the printer driver 33 (hereinafter, to as the "printer driver 33") executes an allocation-area size determining process. The allocation-area size determining process is a process for determining the size of the allocation area per image on a paper of the size which has been set, based on the first allocation number. The allocation-area size determining process will be described later.

At step S102, the printer driver 33 makes a judgment of whether or not a set value of the "notify optimum layout" 64 is ON. In a case in which the set value is ON, the process advances to step S103, and in a case in which the set value is OFF, the process advances to step S116. At step S103, the printer driver 33 executes a maximum-number calculation process for the orientation of paper which has been associated with the combination of the orientation of the image and the first allocation number. The maximum-number calculation process is a process of calculating the maximum number of the allocation areas which can be arranged with the size of the allocation area maintained to be same as the size of the allocation area determined at step S101. The maximum-number calculation process will be described later. In the following description, the maximum number which has been calculated at step S103 will be referred to as S1.

At step S104, the printer driver 33 executes the maximum-number calculation process for the orientation of paper which has not been associated with the combination of the orientation of image and the first allocation number. The orientation of paper which has not been associated with the combination of the orientation of image and the first allocation number means the portrait orientation when the orientation of paper which has been associated with the combination of the orientation of image and the first allocation number is the landscape orientation, and means the landscape orientation when the orientation of paper which has been associated with the combination of the orientation of image and the allocation number is the portrait orientation. In the following description, the maximum-number which has been calculated at step S104 will be referred to as S2.

At step S105, the printer driver 33 makes a judgment of whether or not the maximum number S1 which has been calculated at step S103 is larger than the first allocation number. In a case in which the maximum number S1 is larger than the first allocation number, the process advances to step S106, and in a case in which the maximum number is same as or smaller than the first allocation number, the process advances to step S107.

At step S106, the printer driver 33 generates a layout image which indicates a layout in which the allocation areas are arranged according to the maximum number S1, on a paper of the size which has been set, and having an orientation which has been associated with the combination of the orientation of image and the first allocation number. At step S107, the printer driver 33 makes a judgment of whether or not the maximum number S2 which has been calculated at step S104 is larger than the first allocation number. In a case in which the maximum number S2 is larger than the first allocation number, the process advances to step S108, and in a case in which the maximum number S2 is same as or smaller than the first allocation number, the process advances to step S109.

At step S108, the printer driver 33 generates a layout image which indicates a layout in which the allocation areas are arranged according to the maximum number S2, on a paper of the size which has been set, and having an orientation which has not been associated with the combination of the orientation of image and the first allocation number. At step S109, the printer driver 33 makes a judgment of whether or not at least one of the maximum number S1 and the maximum number S2 is larger than the first allocation number. In a case in which at least one of the maximum number S1 and the maximum number S2 is larger than the first allocation number, the process advances to step S110, and in a case in which at least one of the maximum number S1 and the maximum number S2 is same as or smaller than the allocation number, the process advances to step S116. Step S109 is an example of a judging process.

At step S110, the printer driver 33 generates a layout image which indicates a layout in which the allocation areas are arranged according to the first allocation number, on a paper of the size which has been set, and having an orientation which has been associated with the combination of the orientation of image and the first allocation number. At step S111, the printer driver 33 displays the layout screen 70 on the display section 13, and displays layout images which have been generated at steps S106, S108, and S110, on the layout screen 70. The printer driver 33 waits till the OK button 76 is clicked on the layout screen 70, and as the OK button 76 is clicked, the process advances to step S112.

At step S112, the printer driver 33 makes a judgment of whether or not the allocation number has been changed. Concretely, the printer driver 33, in a case in which "not to be changed" has been selected on the layout screen 70, makes a judgment that the allocation number has not been changed, and in a case in which a layout 1 or a layout 2 has been selected, makes a judgment that the allocation number has been changed. In a case in which the allocation number has been changed, the printer driver 33 allows the process to advance to step S113, and in a case in which the allocation number has not been changed, the printer driver 33 allows the process to advance to step S116.

At step S113, the printer driver 33 updates the first allocation number to an allocation number corresponding to the layout which has been selected on the layout screen 70. Step S113 is an example of an updating process. At step S114, the printer driver 33 makes a judgment of whether the layout which has been selected on the layout screen 70 is the layout 1 or the layout 2. In other words, the printer driver 33 makes a judgment of whether or not the setting of the orientation of paper has been changed. In a case in which the layout selected on the layout screen 70 is the layout 2, or in other words, in a case in which the setting of the orientation of paper has been changed, the process advances to step S115. In a case in which the layout selected on the layout screen 70 is the layout 1, or in other words, in a case in which the setting of the orientation of paper orientation has not been changed, the process advances to step S116. Concretely, when the orientation which has been associated with the combination of the orientation of image and the first allocation number is the landscape orientation, the printer driver 33 updates the orientation to the portrait orientation, and when the orientation which has been associated with the combination of the orientation of image and the first allocation number is the portrait orientation, the printer driver 33 updates the orientation to the landscape orientation.

At step S116, the printer driver 33 generates print data and transmits the print data which has been generated to the printer 2. For generating the print data, when the allocation number has not been updated at step S112, the printer driver 33 allocates images according to the first allocation number on a paper having the orientation which has been associated with the combination of the orientation of image and the first allocation number, or on a paper having the orientation updated at step S114, and when the allocation number has been updated at step S112, the printer driver 33 allocates images according to the second allocation number updated, on the paper having the orientation which has been associated with the combination of the orientation of image and the first allocation number, or on the paper having the orientation updated at step S114. Thereafter, the printer driver 33 terminates the print control process.

<Allocation-Area Size Determining Process>

Next, the allocation-area size determining process which is executed at step S101 will be described below by referring to FIG. 4. The size (width X×height Y) of the allocation area 41 is determined by the first allocation number, a paper width Sw, a paper height Sh, an upper blank-space width Mh1, a lower blank-space width Mh2, a left blank-space width Mw1, a right blank-space width Mw2, the orientation of image (portrait orientation in FIG. 4), the number of rows and the number of columns C×D of image, the minimum blank-space width Wm in a horizontal direction between the adjacent allocation areas, and the minimum blank-space width Hm in a vertical direction between the adjacent allocation areas.

The first allocation number from among the abovementioned values and the orientation of image are to be set on the print setting screen 60. The paper width Sw and the paper height Sh are determined from a paper size which has been set on the print setting screen 60. The upper blank-space width Mh1, the lower blank-space width Mh2, the left blank-space width Mw1, the right blank-space width Mw2, the minimum blank space width Wm in the horizontal direction, and the minimum blank-space width Hm in the vertical direction may have been fixed and set in advance or, an arrangement may be made such that the user can set on the print setting screen 60.

The orientation of paper and the number of rows and the number of columns C×D being associated with the combination of the orientation of image and the allocation number, are determined when the orientation of image and the first allocation number are determined. In FIG. 4, a case in which the orientation of image is the portrait orientation, the first allocation number is 6 in 1, the orientation of paper which has been associated with the combination of the orientation of image and the first allocation number is the landscape orientation, and the number of rows and the number of columns C×D is 2×3, is shown. Moreover, as the paper width Sw, the paper height Sh, the upper blank-space width Mh1, the lower blank-space width Mh2, the left blank-space width Mw1, and the right blank-space width Mw2 are determined, a width W and a height H of a printable area R obtained by excluding the upper blank-space width Mh1, the lower blank-space width Mh2, the left blank-space width Mw1, and the right blank-space width Mw2 from the paper, are determined.

In determination of the size (width X×height Y) of the allocation area 41, first of all, the width X is determined without taking into consideration the height Y. The width X without taking the height Y into consideration is to be calculated by the following expression 1.

$$X = (W - Wm \times (D-1))/D \quad \text{Expression 1}$$

Since an aspect ratio of the allocation area 41 in a case in which the orientation of the allocation area 41 and the orientation of the printable area R, are same, and an aspect ratio of the printable area R, are same, the height Y of the allocation area 41 in the example shown in FIG. 4 is to be calculated by the following expression 2.

$$Y = X \times (H/W) \quad \text{Expression 2}$$

When the allocation areas 41 are arranged on an upper side and a lower side with the number of rows C, letting the height Y calculated by expression 2 to be a height of the allocation area 41, a distance P from a lower side of the allocation area 41 at the lowest stage up to an upper side of the allocation area 41 at the uppermost stage is expressed by the following expression 3.

$$P = Y \times C + Hm \times (C-1) \quad \text{Expression 3}$$

In a case in which the distance P is not more than a height H of the printable area, the X and Y mentioned above become the width and the height respectively of the allocation area 41. However, as mentioned above, since the width X of the allocation area 41 is a width which has been determined without taking into consideration the height Y of the allocation area 41, there are cases in which the distance P is larger than the height H of the printable area. The distance P is larger than the height H of the printable area means that the allocation area is not accommodated in the printable area R. Therefore, in that case, the height Y of the allocation area 41 is to be determined by the following expression 4.

$$Y = (H - Hm \times (C-1))/C \quad \text{Expression 4}$$

In this case, in the example shown in FIG. 4, the width X of the allocation area 41 is determined by the following expression 5.

$$X = Y \times (W/H) \quad \text{Expression 5}$$

In a case of the example shown in FIG. 4, since the distance P becomes larger than the height H of the printable area when the width X is determined by expression 1, the height Y and the width X are to be calculated by expression 4 and expression 5.

<Maximum-Number Calculation Process>

Figure 9:
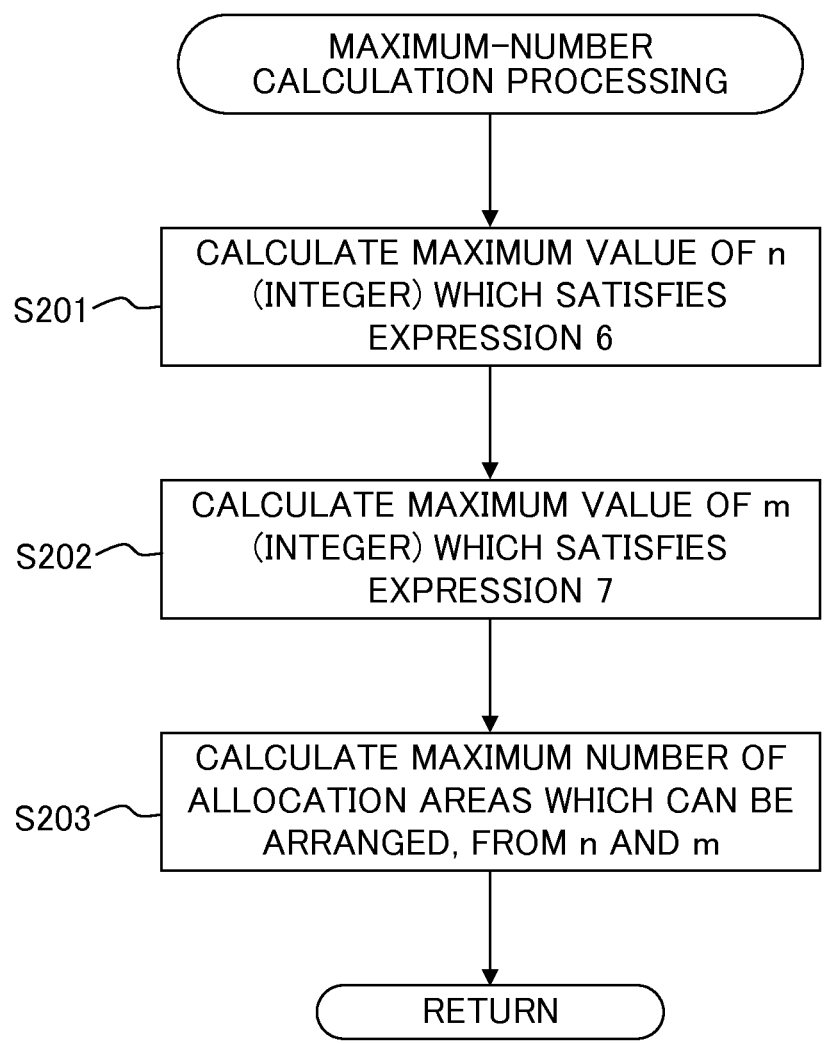
FIG. 9 is a flowchart of a maximum-number calculation process.

Next, the maximum-number calculation process which is executed at step S103 and step S104 will be described below by referring to FIG. 9. Here, to start with, a flowchart of the maximum-number calculation process will be described, and the maximum-number calculation process will be described thereafter by citing a concrete example.

At step S201, the printer driver 33 calculates the maximum value of n (integer) which satisfies the following expression 6.

$$X \times n + Wm \times (n-1) \leq W \quad \text{Expression 6}$$

At step S202, the printer driver 33 calculates the maximum value of m (integer) which satisfies the following expression 7.

$$Y \times m + Hm \times (m-1) \leq H \quad \text{Expression 7}$$

At step S203, the printer driver 33 calculates the maximum number of allocation areas which can be arranged, from the following expression 8.

$$\text{maximum number} = \text{maximum value of } n \times \text{maximum value of } m \quad \text{Expression 8}$$

Next, the abovementioned maximum-number calculation process will be described below by citing a concrete example. Let the values in FIG. 4 be the values shown below for example.

width X of allocation area=55 mm
height Y of allocation area=90 mm
width W of printable area=311 mm
height H of printable area=190 mm
minimum blank-space width Wm in horizontal direction=10 mm
minimum blank-space width Hm in vertical direction=10 mm In a case in which the maximum-number calculation process has been called up from step S103, when the abovementioned values are substituted in expression 6, the expression becomes expression 9 as follows.

$$55 \times n + 10 \times (n-1) \leq 311 \quad n \leq 4.93 \quad \text{Expression 9}$$

In other words, the maximum value of n which satisfies the abovementioned expression 6 becomes 4.

Moreover, when the values are substituted in expression 7, the expression becomes expression 10 as follows.

$$90 \times m + 10 \times (m-1) \leq 190 \quad m \leq 2.00 \quad \text{Expression 10}$$

In other words, the maximum value of m which satisfies expression 7 becomes 2. Therefore, in a case in which the maximum-number calculation process has been called up, the maximum number of allocation areas 41 which can be arranged becomes 8 (=4×2).

A case in which the maximum-number calculation process has been called up from step S104 will be described below. In a case of being called up from step S104, the orientation of paper M is inverted from the portrait orientation to the landscape orientation (and vice versa). However, since the orientation of image, or in other words, the orientation of the allocation area 41 is not inverted even when the orientation of the paper M is inverted, the width X of the allocation area 41 is 55 as it has been, and the height Y of the allocation area 41 is 90 as it has been. Consequently, when the abovementioned values are substituted in expression 6, the expression becomes expression 11 as follows.

$$55 \times n + 10 \times (n-1) \leq 190 n \leq 3.08 \qquad \text{Expression 11}$$

In other words, the maximum value of n which satisfies expression 6 becomes 3.

Moreover, when the values are substituted in expression 7, the expression becomes expression 12 as follows.

$$90 \times m + 10 \times (m-1) \leq 311 m \leq 3.21 \qquad \text{Expression 12}$$

In other words, the maximum value of m which satisfies expression 7 becomes 3. Therefore, in a case in which the maximum-number calculation process has been called up, the maximum number of allocation areas 41 which can be arranged becomes 9 (=3×3).

Effects of Embodiment

According to the printer driver 33 according to the first embodiment described heretofore, by the user who has been informed by the layout screen 70 that it is possible to allocate images according to the second allocation number, is able to allocate the number of images larger than the first allocation number on one surface of the sheet, with the size of the images maintained to be same as in a case in which the images are allocated according to the first allocation number on one surface of the sheet, by selecting the second allocation number on the layout screen 70. Therefore, according to the printer driver 33, in N in 1 printing, it is possible to use the paper effectively without making the size of the image smaller as compared to the case in which the images are allocated according to the allocation number which has been set by the user on the print setting screen 60.

Furthermore, according to the printer driver 33, for each of the case in which the paper is let to be in the landscape orientation and the case in which the paper is let to be in the portrait orientation, a judgment of whether or not it is possible to arrange the allocation areas according to the second allocation number is made. Accordingly, even when it is not possible to arrange the allocation areas according to the second allocation number in the case in which the paper is let to be in the landscape orientation, in the case in which it is possible to arrange the allocation areas according to the second allocation number in the case in which the paper is let to be in the portrait orientation, since the user has been informed that it is possible to allocate the images according to the second allocation number, it is possible to use the paper effectively.

Furthermore, according to the printer driver 33, since the layout in which the allocation areas are arranged according to the second allocation number is displayed on the layout screen 70, the user is able to check the layout in which the allocation areas are arranged according to the second allocation number. Accordingly, the user is able to judge more easily whether to allocate the images according to the first allocation number or to allocate the images according to the second allocation number.

Furthermore, according to the printer driver 33, in the case in which the second allocation number has been selected on the layout screen 70, since the first allocation number is updated to the second allocation number, the user does not have to reset the allocation number upon returning to the print setting screen 60. Accordingly, convenience of the user is enhanced.

Furthermore, according to the printer driver 33, in the case in which there exists the plurality of second allocation numbers, since the user is made to select one of the first allocation number and the plurality of the second allocation numbers, the user is able to select the allocation number from among the first allocation number and the plurality of the second allocation numbers.

It is possible that among users, there might be a user who desires that the images be allocated according to the first allocation number which the user has set on the print setting screen, contrarily, feels it bothersome when informed that it is possible to allocate the images according to the second allocation number. According to the printer driver 33, in the case in which the set value of the "notify optimum layout" 64 is OFF, the layout screen 70 is not displayed. Therefore, the user who feels it bothersome when informed that it is possible to allocate the images according to the second allocation number is able to make an arrangement that the above-mentioned information is not provided, by putting the set value of the "notify optimum layout" 64 OFF.

Second Embodiment

Next, a second embodiment of the present invention will be described below. In the abovementioned first embodiment, the description has been made by citing an example of the case of making the judgment of whether or not it is possible to arrange according to the second allocation number for the case of letting the paper to be in the landscape orientation and the case of letting the paper to be in the portrait orientation. Whereas, a judgment of whether or not it is possible to arrange according to the second allocation number only for the orientation of paper which has been associated with the combination of any one orientation of image which has been set on the print setting screen 60 out of the landscape orientation and the portrait orientation, and the first allocation number, may be made.

Figure 8A:
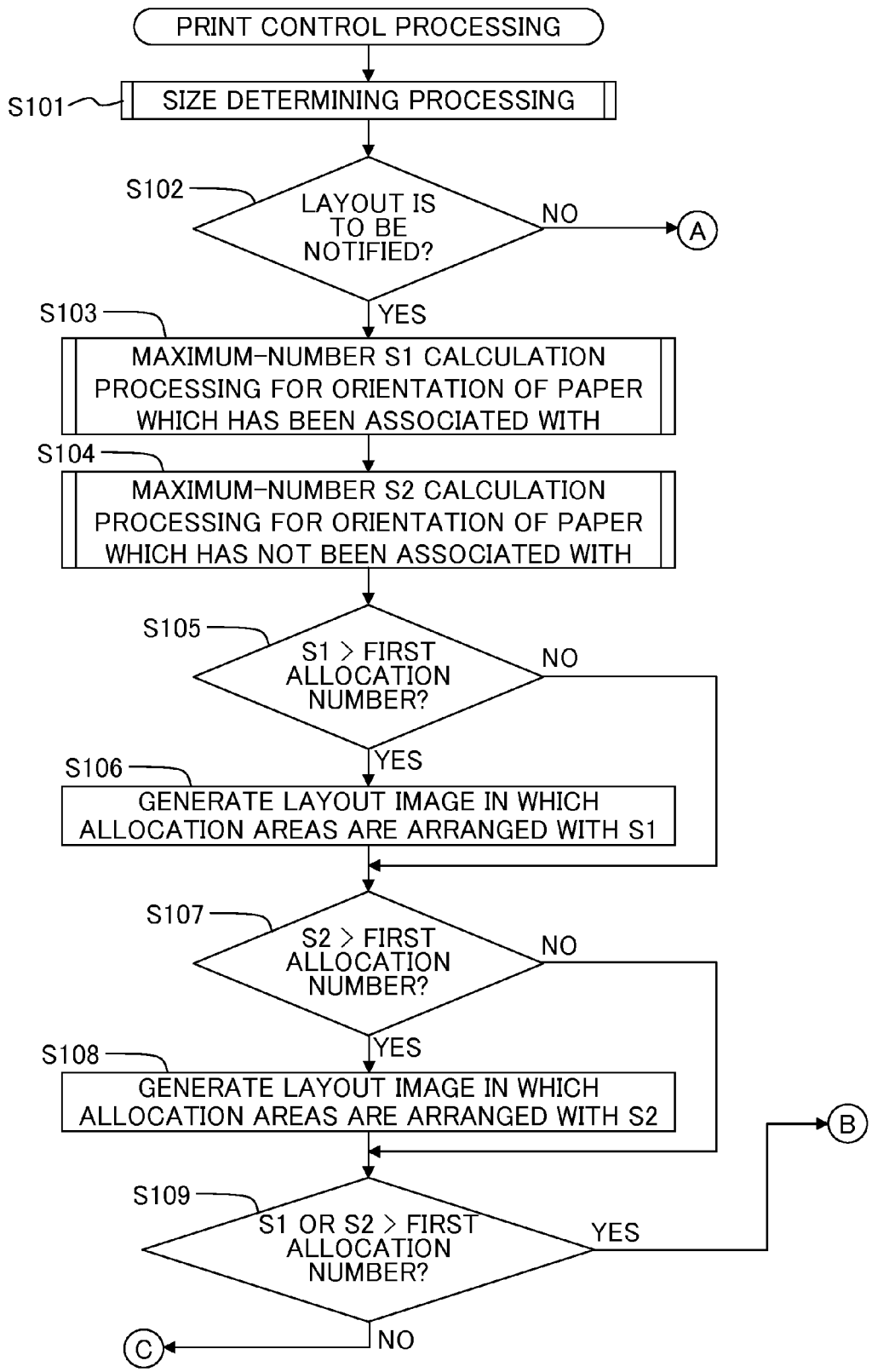

A flowchart of a print control process according to the second embodiment being practically the same as the flowchart shown in FIG. 8 except for steps S104, S107, and S108 in the flowchart shown in FIG. 8 are not executed, and only the maximum number S1 is used for judgment at step S109, the repetitive description is omitted.

According to the printer driver 33 according to the abovementioned second embodiment, the judgment of whether or not it is possible to arrange the allocation areas according to the second allocation number is made only for the orientation of paper which has been set on the print setting screen 60. For instance, let us assume that the user has set an allocation number for which the landscape orientation has been associated with as the orientation of paper on the print setting screen 60. In this case, let us assume that it is not possible to arrange the allocation areas according to the second allocation number when the paper is let to be in the landscape orientation, and let us assume that it is possible to arrange the allocation areas according to the second allocation number when the paper is let to be in the portrait orientation. In this case, as the user has set the allocation number for which the landscape orientation has been associated with as the orientation of paper, even when it is possible to allocate images according to the second allocation number when the orientation is let to be the portrait orientation, there is a possibility that the user is not willing to do so. According to the printer driver 33 according to the second embodiment, it is possible to make an arrangement such that no image is printed on a paper having an orientation which is not desired by the user.

Other Embodiments

The present invention is not restricted to the embodiments which have been explained by the abovementioned description and the diagrams, and embodiments such as the following embodiments are also to be included in the scope of the present invention.

In the embodiments described heretofore, a case of informing the user by displaying on the layout screen 70 that it is possible to allocate images according to the second allocation number with the size of the images maintained to be same as the size when the image had been allocated according to the first allocation number, has been described. However, it is possible to inform the user by various methods. For example, the user may be informed by an audio.

In the embodiments described heretofore, the description has been made by citing an example of the case of displaying the layout image in which the allocation areas have been arranged according to the second allocation number on the layout screen 70. However, the second allocation number may be displayed by characters instead of the layout image.

Moreover, the second allocation number may not be informed to the user necessarily by the layout screen 70. For example, the user may only be notified that it is possible to allocate the number of images larger than the first allocation number with the size of images maintained to be same as in the case when the images had been allocated according to the first allocation number, and the second allocation number may not be informed to the user.

In the embodiments described heretofore, the description has been made by citing an example of the case in which the user is able to carry out setting of whether or not to make a judgment of whether or not the second allocation number exists, by setting the set value of the "notify optimum layout" 64. However, an arrangement may be made such that the judgment of whether or not the second allocation number exists is made all the time, without providing the item "notify optimum layout" 64 on the print setting screen 60.

In the embodiments described heretofore, the description has been made by citing an example of the case in which the layout screen 70 has been displayed in the print control process. However, the layout screen 70 may be called up from the print setting screen 60. For instance, a judgment of whether or not the second allocation number exists may be made when the OK button 66 has been clicked on the print setting screen 60. Moreover, in a case in which the second allocation number does exist, the layout screen 70 may be displayed. In this case, as the user selects a layout on the layout screen 70, the screen may return to the print screen 50, or an arrangement may be made such that the layout cannot be selected on the layout screen 70, and as the OK button 66 is clicked, the screen returns to the print setting screen 60, and the first allocation number is to be reset on the print setting screen 60.

In the embodiments described heretofore, the description has been made by citing an example of the case in which the allocation numbers are set directly such as 2 in 1 and 4 in 1 as the first allocation number. However, the first allocation number may be set by setting the number of rows and the number of columns for example.

In the embodiments described heretofore, the description has been made by citing an example of the PC 1 as an information processing apparatus and a print control apparatus. However, the information processing apparatus and the print control apparatus may be a portable telephone or may be a portable information terminal.

What is claimed is:

1. A non-transitory computer-readable medium storing computer-executable instructions that, when executed by a processor, cause an information processing apparatus to:
    perform a first receiving process for receiving a setting of a first allocation number, which is the number of images to be allocated on one surface of a sheet, the sheet being of rectangular shape and having a short side and a long side;
    perform a size determining process for determining a size of an allocation area which is to be allocated to each individual image on the sheet, based on the first allocation number which has been received in the first receiving process;
    perform a judging process for judging whether it is possible to arrange, on the one surface of tile sheet, allocation areas each of which has the size determined in the size determining process, according to a second allocation number which is greater than the first allocation number, wherein in the judging process, a judgment of whether it is possible to arrange the allocation areas according to the second allocation number is performed by changing an orientation of the sheet with respect to the allocation areas; and
    perform a guiding process for guiding that it is possible to allocate the images according to the second allocation number while maintaining the size of the allocation area determined in the size determining process for each of the images, in a case that it is judged in the judging process that it is possible to arrange the allocation areas according to tile second allocation number.

2. The medium according to claim 1, wherein
    in the judging process, a judgment whether it is possible to arrange the allocation areas according to the second allocation number is performed for each of a case in which the sheet is arranged such that the long side extends in a horizontal direction, and a case in which the sheet is arranged such that the long side extends in a vertical direction.

3. The medium according to claim 2, wherein the instructions further cause the information processing apparatus to:
    perform a selection process for selecting one of the first allocation number and a plurality of the second allocation numbers, in a case that it is judged in the judging process that it is possible to arrange the allocation areas according to the second allocation number, for each of the case in which the sheet has been arranged such that the long side extends in the horizontal direction, and the case in which the sheet has been arranged such that the long side extends in the vertical direction; and
    an updating process for updating the first allocation number to the second allocation number selected in the selection process, in a case that one of the second allocation numbers has been selected in the selection process.

4. The medium according to claim 1, wherein the sheet is rectangular-shaped having a short side and a long side, and
    in the first receiving process, a setting of one of a landscape orientation in which the long side is in a horizontal direction and a portrait orientation in which the long side is in a vertical direction is received, as an orientation of the sheet, and in the judging process, a judgment whether it is possible to arrange the allocation areas according to the second allocation number is made only for the orientation of the sheet which has been received in the first receiving process.

5. The medium according to claim 1, wherein the information processing apparatus further includes display unit, and the instructions cause the display unit to display a layout in which the allocation areas are arranged on the one surface of the sheet, according to the second allocation number.

6. The medium according to claim 1, wherein the instructions further cause the information processing apparatus to:
perform a selection process for selecting one of the first allocation number and the second allocation number, in a case that it is judged in the judging process that it is possible to arrange the allocation areas according to the second allocation number; and
perform an updating process for updating the first allocation number to the second allocation number in a case that the second allocation number has been selected in the selection process.

7. The medium according to claim 1, wherein the instructions further cause the information processing apparatus to perform a second receiving process for receiving a setting of whether the judging process is to be executed, before the judging process, and
in a case that a setting of not to execute the judging process has been received in the second receiving process, the instructions cause the information processing apparatus not to execute the judging process.

8. The medium according to claim 1, wherein the first allocation number is an integer not smaller than two, and
in the size determining process, the size of each of the allocation areas is determined such that sizes of all the allocation areas are same.

9. A print control apparatus comprising:
a guiding section configured to provide information; and
a processing section configured to execute:
a first receiving process for receiving a setting of a first allocation number, which is the number of images to be allocated on one surface of a sheet, the sheet being of rectangular shape and having a short side and a long side;
a size determining process for determining a size of an allocation area which is to be allocated to each individual image on the sheet, based on the first allocation number which has been received in the first receiving process;
a judging process for judging whether it is possible to arrange, on the one surface of the sheet, allocation areas each of which has the size determined in the size determining process, according to a second allocation number which is greater than the first allocation number, wherein in the judging process, a judgment of whether it is possible to arrange the allocation areas according to the second allocation number is performed by changing an orientation of the sheet with respect to the allocation areas; and
a guiding process for guiding by controlling the guiding section, that it is possible to allocate the images according to the second allocation number while maintaining the size of the allocation area determined in the size determining process for each of the images,
in a case that it is judged in the judging process that it is possible to arrange the allocation areas according to the second allocation number.

10. The print control apparatus according to claim 9, wherein
the processing section is configured to judge whether it is possible to arrange the allocation areas according to the second allocation number for each of a case in which the sheet is arranged such that the long side extends in a horizontal direction, and a case in which the sheet is arranged such that the long side extends in a vertical direction, in the judging process.

11. The print control apparatus according to claim 10, wherein the processing section is configured to further perform:
a selection process for selecting one of the first allocation number and a plurality of the second allocation numbers, in a case that it is judged in the judging process that it is possible to arrange the allocation areas according to the second allocation number, for each of the case in which the sheet has been arranged such that the long side extends in the horizontal direction, and the case in which the sheet has been arranged such that the long side extends in the vertical direction; and
an updating process for updating the first allocation number to the second allocation number selected in the selection process, in a case that one of the second allocation numbers has been selected in the selection process.

12. The print control apparatus according to claim 9, wherein,
in the first receiving process, the processing section is configured to receive a setting of one of a landscape orientation in which the long side is in a horizontal direction and a portrait orientation in which the long side is in a vertical direction, as an orientation of the sheet, and
in the judging process, the processing section is configured to judge whether it is possible to arrange the allocation areas according to the second allocation number, only for the orientation of the sheet which has been received in the first receiving process.

13. The print control apparatus according to claim 9, wherein in the guiding process, the processing section is configured to display a layout, in which the allocation areas are arranged on the one surface of the sheet according to the second allocation number, on the guiding section.

14. The print control apparatus according to claim 9, wherein the processing section is configured to further perform:
a selection process for selecting one of the first allocation number and the second allocation number, in a case that it is judged in the judging process that it is possible to arrange the allocation areas according to the second allocation number; and
an updating process for updating the first allocation number to the second allocation number in a case that the second allocation number has been selected in the selection process.

15. The print control apparatus according to claim 9, wherein the processing section is configured to further perform a second receiving process for receiving a setting of whether the judging process is to be executed, before the judging process, and
in a case that a setting of not to execute the judging process has been received in the second receiving process, the processing section is configured not to execute the judging process.

16. The print control apparatus according to claim 9, wherein the first allocation number is an integer not smaller than two, and in the size determining process, the processing section is configured to determine the size of each of the allocation areas such that sizes of all the allocation areas are same.

* * * * *

UNITED STATES PATENT AND TRADEMARK OFFICE
CERTIFICATE OF CORRECTION

| | | |
|---|---|---|
| PATENT NO. | : 9,001,375 B2 | Page 1 of 1 |
| APPLICATION NO. | : 13/954060 | |
| DATED | : April 7, 2015 | |
| INVENTOR(S) | : Mareyuki Murata | |

It is certified that error appears in the above-identified patent and that said Letters Patent is hereby corrected as shown below:

Claims

Column 14, lines 11-40

Claim 1 should read:

1. A non-transitory computer-readable medium storing computer-executable instructions that, when executed by a processor, cause an information processing apparatus to:

perform a first receiving process for receiving a setting of a first allocation number, which is the number of images to be allocated on one surface of a sheet, the sheet being of rectangular shape and having a short side and a long side;

perform a size determining process for determining a size of an allocation area which is to be allocated to each individual image on the sheet, based on the first allocation number which has been received in the first receiving process;

perform a judging process for judging whether it is possible to arrange, on the one surface of the sheet, allocation areas each of which has the size determined in the size determining process, according to a second allocation number which is greater than the first allocation number, wherein in the judging process, a judgment of whether it is possible to arrange the allocation areas according to the second allocation number is performed by changing an orientation of the sheet with respect to the allocation areas; and perform a guiding process for guiding that it is possible to allocate the images according to the second allocation number while maintaining the size of the allocation area determined in the size determining process for each of the images, in a case that it is judged in the judging process that it is possible to arrange the allocation areas according to the second allocation number.

Signed and Sealed this
Thirteenth Day of October, 2015

Michelle K. Lee
*Director of the United States Patent and Trademark Office*